US010046700B2

(12) United States Patent
Fujita et al.

(10) Patent No.: US 10,046,700 B2
(45) Date of Patent: Aug. 14, 2018

(54) IMAGE PROCESSING DEVICE

(71) Applicant: MITSUBISHI ELECTRIC CORPORATION, Tokyo (JP)

(72) Inventors: Takeo Fujita, Tokyo (JP); Narihiro Matoba, Tokyo (JP); Tatsuya Mitsugi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 893 days.

(21) Appl. No.: 14/400,770

(22) PCT Filed: May 20, 2013

(86) PCT No.: PCT/JP2013/003181
§ 371 (c)(1),
(2) Date: Nov. 12, 2014

(87) PCT Pub. No.: WO2013/175753
PCT Pub. Date: Nov. 28, 2013

(65) Prior Publication Data
US 2015/0130942 A1    May 14, 2015

(30) Foreign Application Priority Data

May 22, 2012  (JP) ................................. 2012-116755

(51) Int. Cl.
*B60R 1/00* (2006.01)
(52) U.S. Cl.
CPC .......... *B60R 1/00* (2013.01); *B60R 2300/105* (2013.01); *B60R 2300/605* (2013.01); *B60R 2300/607* (2013.01)

(58) Field of Classification Search
CPC ................ B60R 1/00; B60R 2300/105; B60R 2300/605; B60R 2300/607
(Continued)

(56) References Cited

U.S. PATENT DOCUMENTS 7,307,655 B1    12/2007  Okamoto et al.
2003/0210407 A1*  11/2003  Xu ..................... G01B 11/2545
356/611
(Continued)

FOREIGN PATENT DOCUMENTS

CN    101146231 A    3/2008
CN    101498889 A    8/2009
(Continued)

*Primary Examiner* — On S Mung
(74) *Attorney, Agent, or Firm* — Birch, Stewart, Kolasch & Birch, LLP

(57) ABSTRACT

An image processing device includes a distance information acquisition unit and an image combination unit. Based on positions of a common subject on a plurality of images captured by a plurality of cameras for capturing surrounding images of a vehicle, the distance information acquisition unit calculates a first subject distance from a vehicle reference position to the common subject, and calculates, based on the first subject distance, a second subject distance to a subject captured by one of the plurality of cameras. Based on the first subject distance and the second subject distance, the image combination unit converts the captured images in which the plurality of cameras are employed as viewpoints to images in which the reference position is employed as a viewpoint, and combines the converted images on a single plane of projection.

20 Claims, 12 Drawing Sheets

(58) Field of Classification Search
USPC .......................................................... 348/148
See application file for complete search history.

(56) References Cited

U.S. PATENT DOCUMENTS

2004/0105579 A1* 6/2004 Ishii ..................... B60R 1/00
382/154
2004/0260469 A1 12/2004 Mizusawa

FOREIGN PATENT DOCUMENTS

| CN | 101882306 A | 11/2010 |
| CN | 101976460 A | 2/2011 |
| EP | 1 302 365 A2 | 4/2003 |
| JP | 8-214213 A | 8/1996 |
| JP | 3286306 B2 | 5/2002 |
| JP | 2002-166802 A | 6/2002 |
| JP | 2002-369186 A | 12/2002 |
| JP | 2004-312523 A | 11/2004 |
| JP | 2005-198160 A | 7/2005 |
| JP | 2006-135797 A | 5/2006 |
| JP | 2006338566 A * | 12/2006 |
| JP | 3871614 B2 | 1/2007 |
| JP | 2007-036668 A | 2/2007 |
| JP | 2007-049276 A | 2/2007 |
| JP | 2007-089081 A | 4/2007 |
| JP | 2007-251880 A | 9/2007 |
| JP | 2009-188635 A | 8/2009 |
| JP | 4861574 B2 | 1/2012 |

\* cited by examiner

6

(A)

(B)

(C)

IMAGE PROCESSING DEVICE

TECHNICAL FIELD

The present invention relates to an in-vehicle image processing device for assisting a driver to check the surroundings of a vehicle by capturing a blind spot, arising when driving the vehicle, by a camera and generating an image thereof.

BACKGROUND ART

When driving a vehicle, the driver visually checks a surrounding status of the vehicle. However, a blind spot sometimes arises where the driver cannot visually recognize due to the vehicle body of its own or existing obstacles. "Blind spot" means an area of which one cannot get a view from a certain angle. Here, it means an area of which the driver cannot get a view. "Vehicle of its own" means a vehicle that the driver is on. In order to assist the driver to recognize such a blind spot, a technology is proposed in which an image of the surroundings of vehicle is captured by a camera mounted on the vehicle body and the image is displayed on a screen of a display device installed in the vehicle. The followings are examples of such a technology.

A technology is described in Patent Document 1 in which, by using lateral cameras and a rear camera, images are cut out from the respective camera images, to be combined and displayed. An image cutting out range is changed depending on a vehicle speed. When the vehicle runs faster, lateral camera images are cut out in wider ranges. Thus, an area to be displayed as a combined image is broadened, so that blind spots can be decreased. "Lateral camera" means a camera for capturing images in the right side or left side of the vehicle. "Rear camera" means a camera for capturing images in the rear side of the vehicle. "Vehicle speed" means a speed of the vehicle.

A method is described in Patent Document 2 in which surrounding images of a vehicle captured by a plurality of cameras are combinedly displayed on a display device while each ratio of image displaying areas to a screen area of the display device is changed. By changing each displaying ratio depending on a status of steering wheel operation, a notable image can be highlighted from among a plurality of captured images displayed on a single screen.

PRIOR ART DOCUMENTS

Patent Documents

Patent Document 1: Japanese Unexamined Patent Application Publication No. 2004-312523 (Paragraphs 0021 through 0024, FIG. 2)
Patent Document 2: Japanese Unexamined Patent Application Publication No. 2005-198160 (Paragraphs 0030 through 0038, FIG. 1)

SUMMARY OF THE INVENTION

Problem that the Invention is to Solve

In a conventional technology shown in Patent Document 1, however, a method of performing viewpoint conversion for combining a plurality of camera images is not specifically disclosed. If cutting out of an image area from each of the camera images and the viewpoint conversion are independently performed, a straight line is displayed in a bent manner at a connection between the camera images, and thus, there has been a problem that one cannot easily recognize a shape of the subject visually because it has an unnatural shape.

Also in a conventional technology shown in Patent Document 2, similar to the above, each displaying ratio of camera images to be displayed is changed in accordance with steering wheel operation etc. However, viewpoint conversion of images is described only from the standpoint of aligning simultaneously-displayed images so that a vehicle traveling direction of each of the images is aligned in a same direction. That is, the conventional technology shown in Patent Document 2 does not consider a connection between the images. Therefore, a shape of the subject located at a boundary area between a plurality of cameras cannot be perceived correctly, and thus, there has been a problem that a driver cannot easily recognize the subject.

A task of the present invention is to provide an image processing device for a driver to be able to easily check images of a surrounding status of a vehicle. That is, the degree of bent of a subject shape is reduced even at a boundary portion between camera images. Also, display of the subject having an overlapped portion is suppressed. In addition, display of the subject having a lacked portion is suppressed. In this way, a task of the present invention is to provide an image processing device in which a shape substantially similar to the one when a driver actually recognizes it visually is displayed on a screen.

Means for Solving the Problem

In order to solve the above-described problems, an image processing device according to the claimed invention includes: a distance information acquisition unit that calculates, based on positions of a common subject on a plurality of images captured by a plurality of cameras for capturing surrounding images of a vehicle, a first subject distance from a reference position of the vehicle to the common subject, and that calculates, based on the first subject distance, a second subject distance to a subject captured by one of the plurality of cameras; and an image combination unit that converts, based on the first subject distance and the second subject distance, the captured images in which the plurality of cameras are employed as viewpoints to images in which the reference position is employed as a viewpoint, and that combines the converted images on a single plane of projection.

Advantageous Effects of the Invention

According to the claimed invention, the degree of bent of a subject shape is reduced even at a boundary portion between camera images, and thus visibility can be improved.

MODE FOR CARRYING OUT THE INVENTION

Embodiment 1

Figure 1:
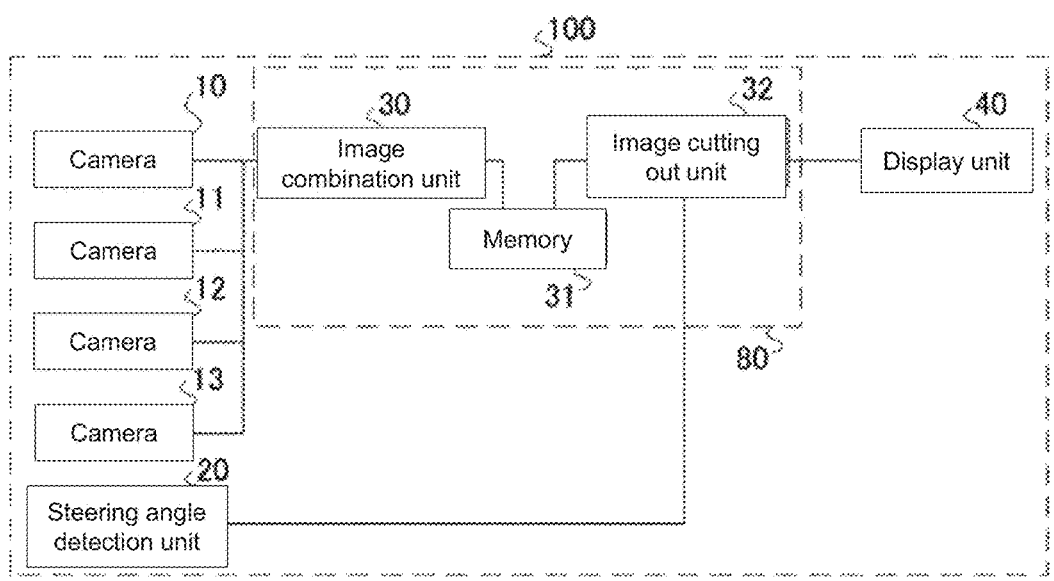
FIG. 1 is a block diagram showing a driving support device in Embodiment 1.

FIG. 1 is a block diagram showing a configuration of a driving support device 100 in Embodiment 1. The driving support device 100 according to the present invention includes cameras 10, 11, 12, and 13, a steering angle detection unit 20, an image combination unit 30, an image cutting out unit 32, and a display unit 40. The driving support device 100 may further include a memory 31. An image processing device 80 according to Embodiment 1 includes the image combination unit 30. The image processing device 80 may include the image cutting out unit 32. The image processing device 80 may include the memory 31.

The cameras 10, 11, 12, and 13 capture surrounding images of a vehicle. The steering angle detection unit 20 detects a turning angle of a steering wheel of the vehicle. "Turning angle of a steering wheel" means an angle when the steering wheel is turned. "Turning a steering wheel" means an operation of changing a vehicle traveling direction by turning the steering wheel. In other words, "turning angle of a steering wheel" is an angle of turning the steering wheel and means an angle which represents the degree of changing the vehicle traveling direction.

The image combination unit 30 combines inputted images from the cameras 10, 11, 12, and 13, and generates an image showing whole circumference of the surroundings of vehicle. Here, "combination" means putting images together, each captured by the respective cameras 10, 11, 12, and 13. Thus, "combination" does not include overlapping of the images on a single image, each captured by the respective cameras 10, 11, 12, and 13. As to an area whose image is captured by both of the neighboring cameras, such as a direction FR, FL, RR, or RL described later, an area of image to be generated by each camera is predetermined, and either one of camera images is selected on the basis of setting of the area concerned. The image combination unit 30 can also generate an image showing a part of the surroundings of vehicle by combining the inputted images from the cameras 10, 11, 12, and 13.

The memory 31 stores image data outputted from the image combination unit 30. By referring to the image stored in the memory 31, the image cutting out unit 32 determines a cutting out area in accordance with a value outputted from the steering angle detection unit 20, and cuts out an image. The display unit 40 displays the image cut out by the image cutting out unit 32. The display unit 40 is disposed at the front side of the vehicle with respect to a position of the driver. "Cutting out an image" means extraction of a part of an image. "Cutting out area" means an area where an image is cut out.

Figure 2:
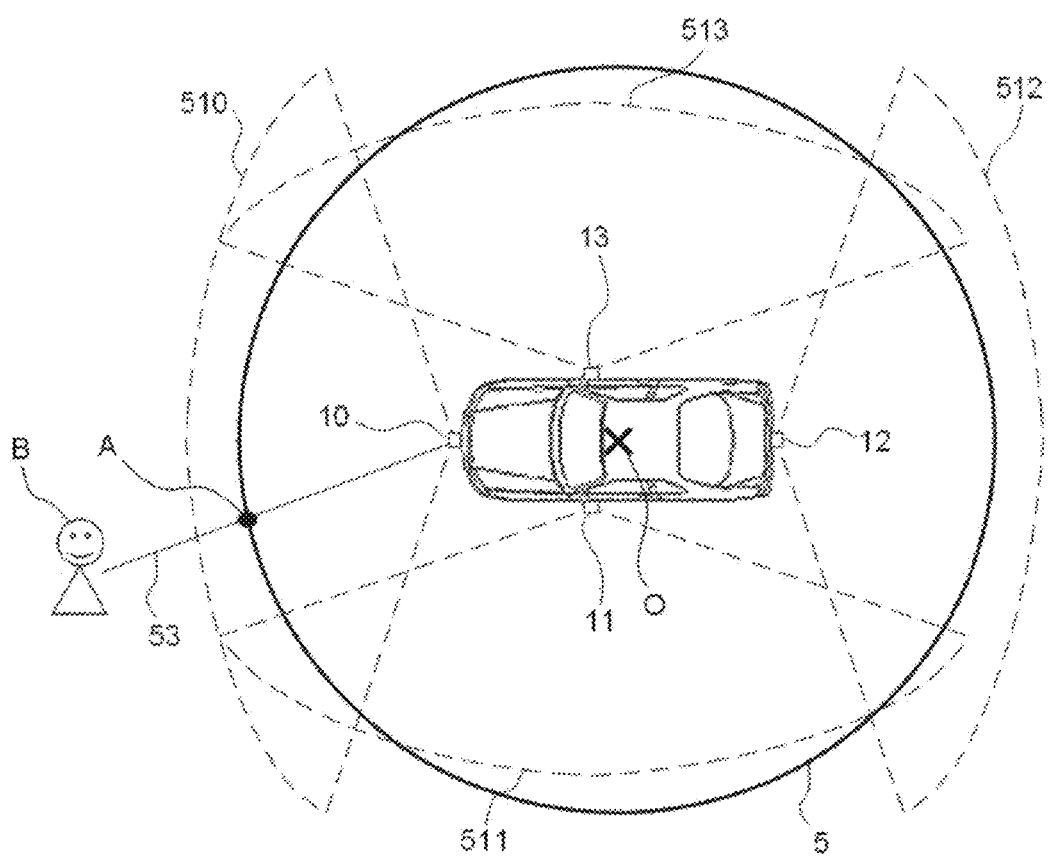
FIG. 2 is a diagram showing positions where cameras are mounted on a vehicle in Embodiment 1.

The cameras 10, 11, 12, and 13 are each mounted on back/forth and right/left parts of the vehicle. The cameras 10, 11, 12, and 13 are disposed so that camera view angles of the four cameras 10, 11, 12, and 13 include the surroundings of vehicle in all directions. "Surroundings of a vehicle in all directions" means 360-degree directions of the surroundings of a vehicle. FIG. 2 is a top view of the vehicle. FIG. 2 is also a schematic diagram for showing positions where the cameras 10, 11, 12, and 13 are mounted.

The image combination unit 30 performs viewpoint conversion and combination of images. Thus, the image combination unit 30 generates an image in which all the images of the four cameras 10, 11, 12, and 13 are connected in the horizontal direction. In order to generate a whole circumference image of 360 degrees in the horizontal direction, centered on a single point, by combining a plurality of camera images, each of the camera images is needed to be projected on a single common virtual plane (plane of projection).

The thick solid line in FIG. 2 shows an example of a common plane of projection 5 for projecting the images of the cameras 10, 11, 12, and 13. The plane of projection 5 is a plane of projection when the images are combined. For example, the plane of projection 5 forms a round shape having a vehicle center as its center O when viewed from above, as shown in FIG. 2. The plane of projection 5 is a cylindrically-shaped plane which encircles the vehicle.

In FIG. 2, the camera 10 is mounted at the center of front side surface of the vehicle. The camera 11 is mounted at the center of left side surface of the vehicle. The camera 12 is mounted at the center of rear side surface of the vehicle. The camera 13 is mounted at the center of right side surface of the vehicle. A camera view-angle range 510 is a view-angle range of the camera 10. A camera view-angle range 511 is a view-angle range of the camera 11. A camera view-angle range 512 is a view-angle range of the camera 12. A camera view-angle range 513 is a view-angle range of the camera 13. The camera view-angle ranges 510, 511, 512, and 513 are indicated by dashed lines. "View angle" is a range captured by a camera, which is represented by an angle. That is, "view-angle range" is a range captured by a camera.

For example, a subject B captured by the camera 10 is considered first to be located at a position A where a straight line 53 which connects the camera 10 and the position of the subject B intersects with the plane of projection 5. As to the subject B at the position A, by calculating a change of subject position in a camera image when a viewpoint position is shifted from the position of camera 10 to the vehicle center position O, conversion of the viewpoint position is performed. That is, when the viewpoint position is shifted from the position of camera 10 to the vehicle center position O, the change of subject position in the camera image is calculated as to the subject B at the position A. "Change of subject position" means a shift of subject position in an image. When putting images together, each captured by the respective cameras 10, 11, 12, and 13, the image combination unit 30 performs the conversion of viewpoint position. This is because the viewpoint position of the respective cameras 10, 11, 12, and 13 differs with each other.

The conversion of viewpoint position is conversion performed when the viewpoint position shifts from each position of the cameras 10, 11, 12, and 13 to the vehicle center O. For example, the image combination unit 30 calculates the change of subject position in the camera image when the viewpoint position is shifted from the position of camera 10 to the vehicle center O as to the subject B at the position A. That is, assuming that the subject B is located at the position A, the conversion of viewpoint position is performed such that the subject B is located in the direction of position A when viewed from the vehicle center O.

Similarly, the conversion of viewpoint position is performed on the images each captured by the respective cameras 11, 12, and 13. For example, as to an area where images captured by the respective cameras overlap, it is determined in advance which one of camera images should be employed.

Thus, images of four directions of the vehicle, i.e. back/forth and right/left, are generated when the vehicle center O is employed as a viewpoint. Four images thus generated are connected while portions where images of the respective cameras are switched are employed as boundaries. The portions where images of the respective cameras 10, 11, 12, and 13 are switched are those in the oblique directions of the vehicle.

Thus, an image having a 360-degree view from the vehicle center can be generated. "Oblique directions of a vehicle" mean right front, left front, right rear, and left rear directions each having a 45-degree tilt with respect to the back/forth direction of the vehicle. That is, they are the four directions FR, FL, RR, and RL shown in FIG. 8 described later.

Figure 3:
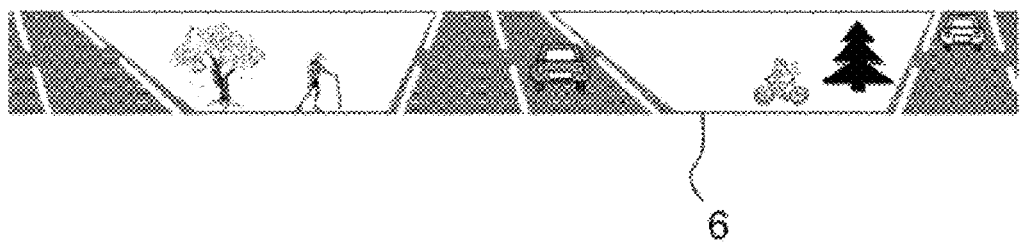
FIG. 3 is a diagram showing an example of a combined image in Embodiment 1.

FIG. 3 is a diagram showing an image generated by using such a projection method. The plane of projection 5 is configured with a gently-curved surface. As described above, the plane of projection in FIG. 2 has the round shape when viewed from the upper direction of vehicle. Thus, since no bend is generated in a subject shape at boundary portions between images of the respective cameras 10, 11, 12, and 13, it is possible to obtain a combined image in which a subject shape substantially similar to the one when the driver directly recognizes it visually is maintained in its whole circumference. The plane of projection 5 may not have the round shape shown in FIG. 2, as long as the shape thereof has a gently-curved surface. This is because no bend is generated in the subject shape as long as "a gentle surface" is employed.

The image cutting out unit 32 receives a signal outputted from the steering angle detection unit 20. In FIG. 1, the unit 32 receives the outputted signal from the steering angle detection unit 20 via the memory 31. The image cutting out unit 32 may directly receive the outputted signal from the steering angle detection unit 20. The image cutting out unit 32 performs processing of changing an image cutting out range 62 (see FIG. 4) in accordance with a steering angle of steering wheel. That is, the unit 32 changes an image cutting out portion in accordance with the steering angle of steering wheel. "Steering angle" means an angle of turning a steering wheel.

Figure 4:
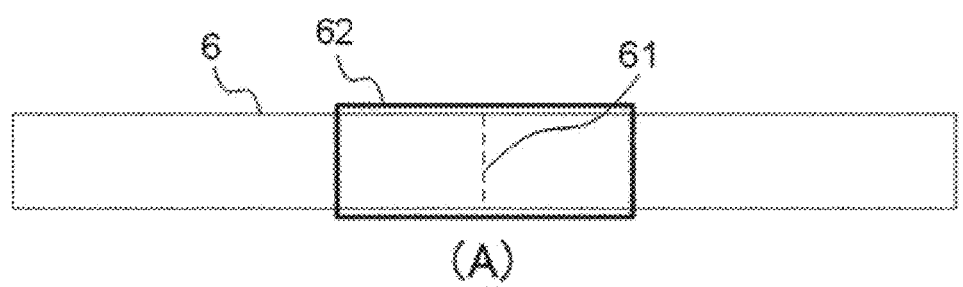
FIG. 4 is a diagram showing correspondence between a steering angle of a steering wheel and an image cutting out portion in Embodiment 1.
Figure 4:
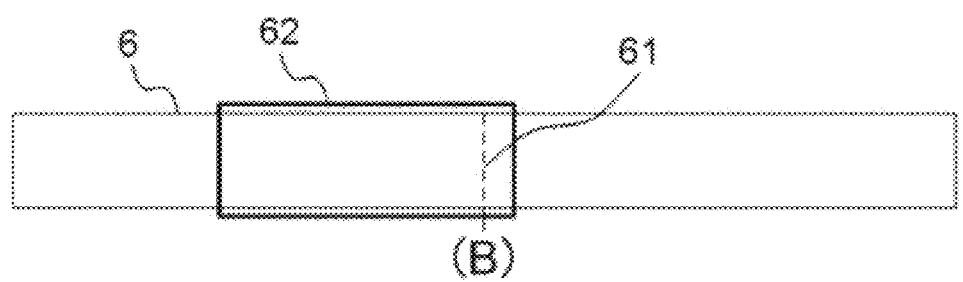
Figure 4:
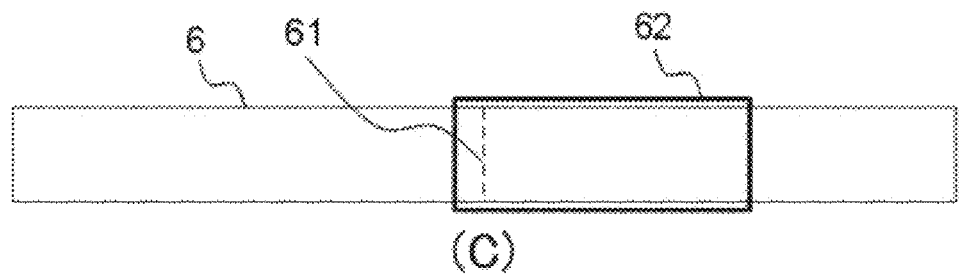

FIG. 4 is a diagram showing correspondence between the steering angle of steering wheel and the image cutting out portion. (A) in FIG. 4 shows a case where the steering wheel rudder angle is 0 degree. (B) in FIG. 4 shows a case where the steering wheel rudder angle is 10 degrees to the left. (C) in FIG. 4 shows a case where the steering wheel rudder angle is 10 degrees to the right. As shown in FIG. 4, in a state where the steering wheel is not turned ((A) in FIG. 4), the image cutting out unit 32 cuts out an image corresponding to a direct front view from the vehicle and having an equal width in both right and left from a center 61 of a combined image 6. "Equal width in both right and left" means that a distance from the right side is equal to a distance from the left side. When the steering wheel is turned left ((B) in FIG. 4), the image cutting out unit 32 shifts the cutting out range 62 to the left. When the steering wheel is turned right ((C) in FIG. 4), the image cutting out unit 32 shifts the cutting out range 62 to the right.

The correspondence between the steering wheel rudder angle and the cutting out portion may be calculated by an arithmetic expression so that the cutting out portion is shifted continuously in proportion to the steering wheel rudder angle. Or, the correspondence between the steering wheel rudder angle and the cutting out portion may be determined by processing on a case-by-case basis in which a specific cutting out portion is assigned to a steering wheel rudder angle within a certain range. When the arithmetic expression is employed, the image cutting out portion is shifted continuously. On the other hand, when the processing on a case-by-case basis is employed, the image cutting out portion is shifted discontinuously. However, if the processing on a case-by-case basis is employed, a processing amount can be reduced compared to that when the arithmetic expression is employed. In a case where the visibility of driver is not deteriorated, employing the processing on a case-by-case basis brings an advantage that faster processing is realized.

The display unit 40 exhibits a front image to the driver by displaying a cutting out image on a display screen.

The driving support device 100 thus configured can display a front image in the vehicle traveling direction in accordance with a steering angle of steering wheel. Also, the driving support device 100 can improve visibility of an obstacle in oblique rear of the vehicle, which is difficult to check due to interruption caused by a center pillar of its own vehicle etc., or of existence or non-existence of other vehicles. "Its own vehicle" means a vehicle on which the driver is getting. "Pillar" means a column of a window of a vehicle door etc. "Center pillar" means a center column between vehicle doors.

Since a bend of subject shape at boundary portions between images of the respective cameras 10, 11, 12, and 13 is reduced, it is possible to display an image in which a subject shape substantially similar to the one when the driver directly recognizes it visually is maintained. Thus, it is possible to improve driver's visibility of a surrounding status of vehicle.

Embodiment 2

Figure 5:
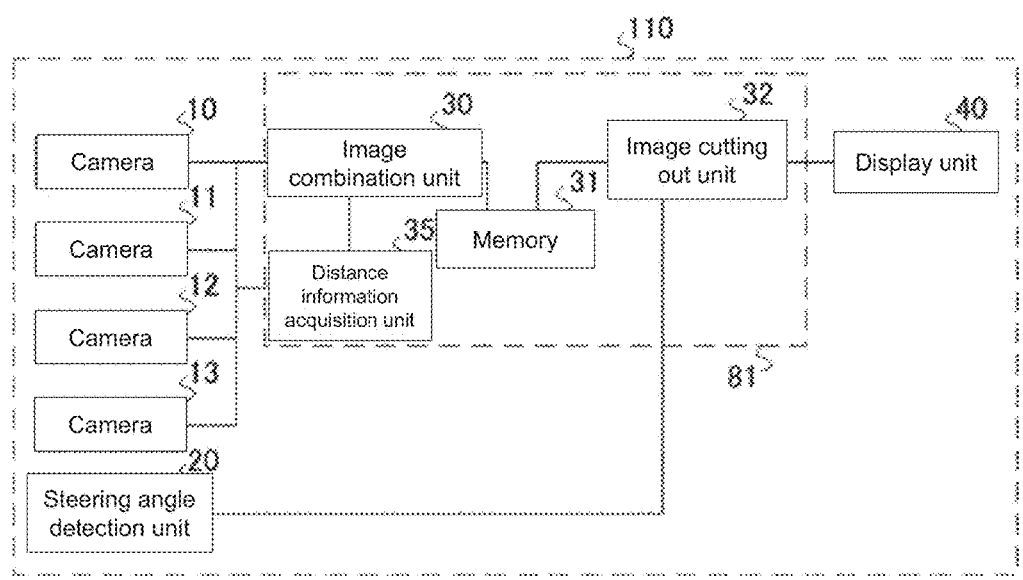
FIG. 5 is a block diagram showing a driving support device in Embodiment 2.

FIG. 5 is a block diagram showing a driving support device 110 in Embodiment 2. The driving support device 110 according to the present invention includes cameras 10, 11, 12, and 13, a steering angle detection unit 20, an image combination unit 30, an image cutting out unit 32, a distance information acquisition unit 35, and a display unit 40. The driving support device 110 may further include a memory 31. An image processing device 81 according to Embodiment 2 includes the image combination unit 30 and the distance information acquisition unit 35. The image processing device 81 may include the image cutting out unit 32. The image processing device 81 may include the memory 31.

The driving support device 110 further includes the distance information acquisition unit 35, which is the difference from the driving support device 100. The cameras 10, 11, 12, and 13, the steering angle detection unit 20, the image combination unit 30, the image cutting out unit 32, the display unit 40, and the memory 31 of the driving support device 110 have similar functions with those of the cameras 10, 11, 12, and 13, the steering angle detection unit 20, the image combination unit 30, the image cutting out unit 32, the display unit 40, and the memory 31 of the driving support device 100. Therefore, contents described about the driving support device 100 will be similarly applicable if there is no specific description. Also, definitions of terms in Embodiment 1 will be similarly applicable if there is no specific description.

The cameras 10, 11, 12, and 13 capture surrounding images of a vehicle. The steering angle detection unit 20 detects a turning angle of a steering wheel of vehicle. The image combination unit 30 combines inputted images from the cameras 10, 11, 12, and 13, and generates an image showing whole circumference of the surroundings of vehicle. The memory 31 stores image data outputted from the image combination unit 30. By referring to the image stored in the memory 31, the image cutting out unit 32 determines a cutting out area in accordance with a value outputted from the steering angle detection unit 20, and cuts out an image. By referring to a same subject portion in the images of the neighboring cameras 10, 11, 12, and 13, the distance information acquisition unit 35 calculates a distance to a subject based on subject positions on the images of the cameras 10, 11, 12, and 13. The display unit 40 displays the cutting out image.

Similar to Embodiment 1, the cameras 10, 11, 12, and 13 are each mounted on back/forth and right/left parts of the vehicle. The cameras 10, 11, 12, and 13 are disposed so that camera view angles of the four cameras 10, 11, 12, and 13 include the surroundings of vehicle in all directions. "Surroundings of a vehicle in all directions" means 360-degree directions of the surroundings of a vehicle.

Figure 6:
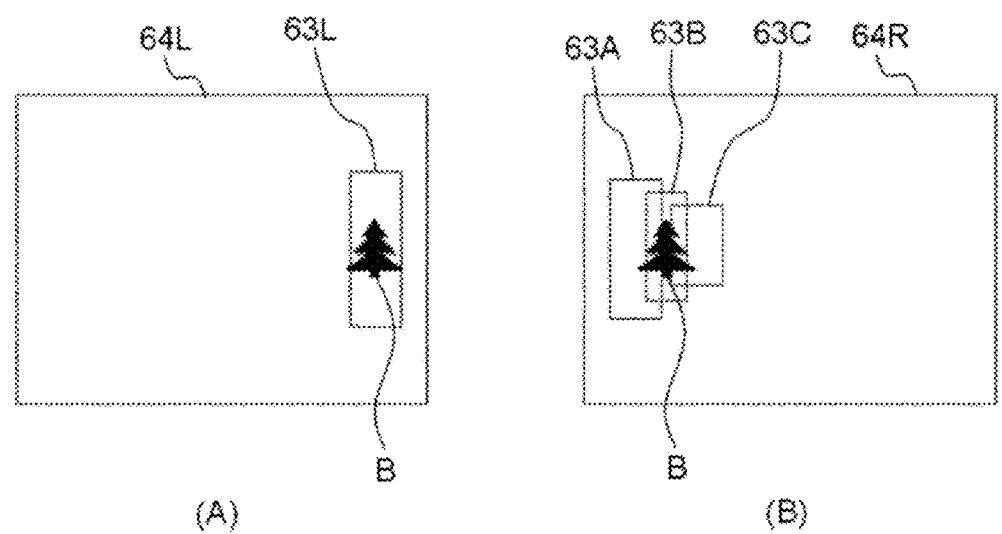
FIG. 6 is a diagram showing a method of matching a subject in Embodiment 2.

The distance information acquisition unit 35 performs matching of a subject on images of the neighboring two cameras. The distance information acquisition unit 35 calculates a distance to the subject. Based on positions of each common subject B on a plurality of images captured by the cameras 10, 11, 12, and 13 for capturing surrounding images of vehicle, the distance information acquisition unit 35 calculates a distance to each common subject B. FIG. 6 is a diagram showing a method of matching a subject. (A) in FIG. 6 is an image of the left camera when combining images. (B) in FIG. 6 is an image of the right camera when combining the images.

Considering distortion of camera images and the subject distance, the distance information acquisition unit 35 designates, as candidates, a plurality of areas where the same subject is captured from among two camera images. Portions each surrounded with a frame in FIG. 6 show examples of matching frames for camera images. Based on information of an image in the matching frame, matching processing is performed. An area indicated by a matching frame is assumed to be a matching area. As to an image 64L of the left camera, the distance information acquisition unit 35 designates one matching area 63L. On the other hand, as to an image 64R of the right camera, the distance information acquisition unit 35 designates three matching areas 63A, 63B, and 63C.

The distance information acquisition unit 35 performs matching on a plurality of designated positions (matching areas 63A, 63B, and 63C) with respect to the matching area 63L. Then, the distance information acquisition unit 35 determines that a subject distance corresponding to an area where a highest matching result is obtained is a correct subject distance. "An area where a highest matching result is obtained" means an area of the best matching. In FIG. 6, the matching area 63B of the image 64R of the right camera is an area of the best matching. "Subject distance" means a distance of the subject B imaged in a matching area from the vehicle center O. As to a value of the subject distance corresponding to each of matching area 63A, matching area 63B, and matching area 63C, a value calculated in advance is assumed to be stored.

That is, in a case where the subject B imaged at a position of the matching area 63B is the same with the subject B imaged at a position of the matching area 63L, an angle is calculated between the optical axis of each camera (left camera or right camera) and a direction of subject B when viewed from each camera position, based on the positions of the subject B on the respective camera images 64L and 64R. In other words, an angle is calculated between a straight line connecting the left camera and the subject B, and the optical axis of left camera. Also, an angle is calculated between a straight line connecting the right camera and the subject B, and the optical axis of right camera. The matching area 63B is a matching area of image 64R of the right camera. The matching area 63L is a matching area of image 64L of the left camera.

A description will be made by exemplifying the cameras 10 and 13 in FIG. 8 described later. The camera 10 is the left camera. The camera 13 is the right camera. The subject B is shown as a subject $B_1$. The optical axis of the camera 10 is an optical axis $OA_{10}$. "Optical axis of left camera" is the optical axis $OA_{10}$. "An angle between a straight line connecting the left camera and the subject B, and the optical axis of left camera" is an angle $\alpha$. That is, an angle between the optical axis $OA_{10}$ of camera 10 and a direction of subject $B_1$ when viewed from the camera 10 is the angle $\alpha$. The optical axis of the camera 13 is an optical axis $OA_{13}$ "Optical axis of right camera" is the optical axis $OA_{13}$. "An angle between a straight line connecting the right camera and the subject B, and the optical axis of right camera" is an angle $\beta$. That is, an angle between the optical axis $OA_{13}$ of camera 13 and a direction of subject $B_1$ when viewed from the camera 13 is the angle $\beta$.

A position $C_{10}$ shows a position of the subject $B_1$ on an image of the camera 10. The subject $B_1$ is located on a straight line $S_{10}$ connecting the camera 10 and the position $C_{10}$. Therefore, the angle $\alpha$ can be obtained from the position $C_{10}$. Similarly, a position $C_{13}$ shows a position of the subject $B_1$ on an image of the camera 13. The subject $B_1$ is located on a straight line $S_{13}$ connecting the camera 13 and the position $C_{13}$. Therefore, the angle $\beta$ can be obtained from the position $C_{13}$.

A distance to the subject can be calculated based on an angle between each optical axis of the two cameras (left camera and right camera) and a subject direction. Here, "distance to the subject" means a distance from the vehicle center O to the subject B. A description will be made by exemplifying the cameras 10 and 13 in FIG. 8 described later. "Distance to the subject" means a distance from the vehicle center O to the subject $B_1$. As described above, the angles $\alpha$ and $\beta$ can be obtained based on the image 64R of right camera and the image 64L of left camera.

The position of subject $B_1$ is a position where the straight line $S_{10}$ and the straight line $S_{13}$ intersect. The positions of cameras 10 and 13 and the position of vehicle center O are already known. The optical axes $OA_{10}$ and $OA_{13}$ are also already known. Therefore, the coordinate of position of subject $B_1$ can be obtained based on the coordinates of positions of cameras 10 and 13, the coordinate of the position of vehicle center O, the optical axes $OA_{10}$ and $OA_{13}$, and the angles $\alpha$ and $\beta$. The straight line $S_{10}$ can be drawn from the position of coordinate of camera 10 based on the coordinate of camera 10, the optical axis $OA_{10}$, and the angle α. Similarly, the straight line $S_{13}$ can be drawn from the position of coordinate of camera 13 based on the coordinate of camera 13, the optical axis $OA_{13}$, and the angle β. The position where the straight lines $S_{10}$ and $S_{13}$ intersect is the position of subject $B_1$. The coordinate of position where the straight lines $S_{10}$ and $S_{13}$ intersect can be obtained from the straight lines $S_{10}$ and $S_{13}$.

Based on the positions of cameras 10, 11, 12, and 13, reference directions for the respective cameras 10, 11, 12, and 13, and each angle between each reference direction and a direction at which the common subject B is located, the distance information acquisition unit 35 obtains the position of subject B.

A case where a matching area is the matching area 63A or the matching area 63C is similar to the above. Thus, the matching area 63L is fixed, and subject distances DA, DB, and DC respectively corresponding to the matching areas 63A, 63B, and 63C of the right camera 64R with respect to the matching area 63L of the left camera 64L are calculated and stored in advance. In this way, a subject distance can be calculated without performing calculation of distance corresponding to each of the matching areas every time. Here, the subject distances DA, DB, and DC are distances from the vehicle center O to the subject B. While the matching area 63L is fixed to a single area in the above example, a plurality of matching areas may be set.

Since an area where matching is performed is limited to an area where the same subject is imaged in the above-described method, an amount of calculation can be reduced. A template matching method may be employed as the matching method. Or, a method may be employed in which characteristic points such as edges and vertexes in an image are extracted and the degrees of correspondence in the characteristic points are measured.

The image combination unit 30 performs viewpoint conversion and combination of images. Thus, the image combination unit 30 generates an image in which all the images of the four cameras 10, 11, 12, and 13 are connected in the horizontal direction. In order to generate a whole circumference image of 360 degrees in the horizontal direction, centered on a single point, by combining a plurality of camera images, each of the camera images is needed to be projected on a single common virtual plane (plane of projection). When performing image combination, the image combination unit 30 improves the accuracy of combination by referring to the subject distance information calculated by the distance information acquisition unit 35.

Figure 7:
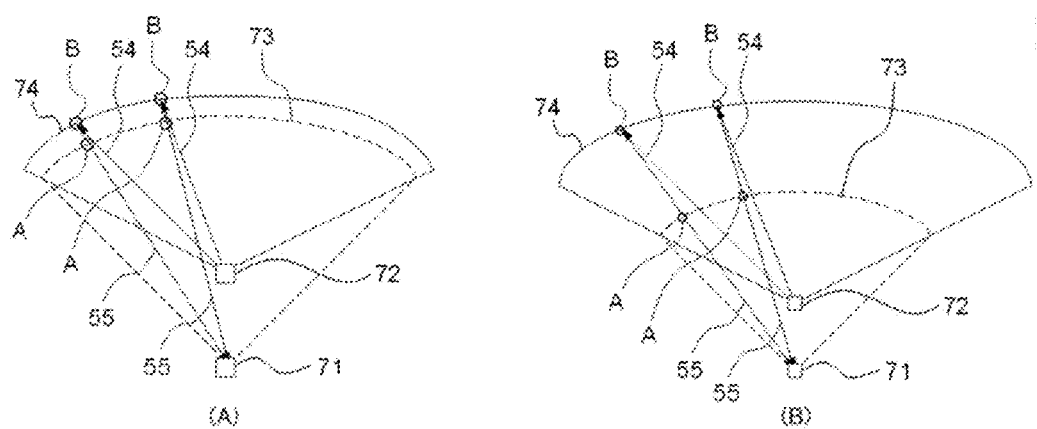
FIG. 7 is a diagram showing displacement of subject positions generated when a plurality of camera images are combined in Embodiment 2.

FIG. 7 is a diagram showing displacement of subject positions generated when a plurality of camera images are combined. Here, displacement of subject position means that a position of the subject B projected on a plane of projection 73 differs depending on a positional relationship between the subject B and the plane of projection 73. In FIG. 7, (A) in FIG. 7 shows a viewpoint conversion method when the subject B located at a subject position 74 is projected on the plane of subject projection 73 located close to the subject position 74. (B) in FIG. 7 shows a viewpoint conversion method when the subject B located at the subject position 74 is projected on the plane of subject projection 73 located away from the subject position 74. Compared to the subject position 74, the plane of subject projection 73 is located closer to a camera position 72. Compared to the subject position 74, the plane of subject projection 73 is located closer to a center position 71 for combining images. A position A shows a position where the subject B is projected on the plane of projection 73.

A straight line 54 that connects the camera position 72 and the subject position 74 shows a direction of subject in an image captured by the camera. That is, the straight line 54 shows a direction of subject B when viewed from the camera position 72. A straight line 55 that connects the center position 71 for combining images and the subject position 74 shows a direction of subject in an image when viewed from the center position 71 for combining images after viewpoint conversion processing is performed. That is, the straight line 55 shows a direction of subject B when viewed from the center position 72.

By taking, as a reference, a common reference position with respect to the plurality of cameras 10, 11, 12, and 13, the image combination unit 30 generates a plane of projection and projects the subject at a position where a straight line that connects the reference position and the subject B intersects with the plane of projection. Based on the distance to each common subject B, the image combination unit 30 combines a plurality of captured images on a single plane of projection. Based on the distance to each common subject B, the image combination unit 30 modifies the subject position A on the plane of projection.

As shown in FIG. 7, in order to generate a whole circumference image of 360 degrees in the horizontal direction, centered on a single point, by combining a plurality of camera images, each of the camera images is needed to be projected on a single common plane. At that time, the camera position 72 differs from the center position 71 of the plane of projection. That is, the camera position 72 differs from the center position 71 for combining images. Therefore, even for subjects captured at a same position on a camera image, a correct position of projection differs depending on each subject distance.

For example, when the subject is closely located as shown in (A) in FIG. 7, the projection position A of the subject B is located at a position close to the straight line 54. On the other hand, when the subject is distantly located as shown in (B) in FIG. 7, the projection position A of the subject B is located at a position away from the straight line 54. Because of such a difference in the projection position of subject B, a phenomenon occurs in which a lacked portion in the subject is generated at a boundary portion between the cameras in a combined image. Or, a phenomenon occurs in which an overlapped portion is generated at a boundary portion between the cameras in a combined image. Therefore, the position of subject B on the plane of projection 73 is determined by calculating the distance from the center position 71 of the plane of projection 73 to the subject B.

By referring to the subject distance information calculated by the distance information acquisition unit 35, information on a subject distance can be obtained about a subject in a direction where view angles of the neighboring cameras overlap with each other. That is, information on a subject distance can be obtained from a subject located at a position where view angles of the neighboring cameras overlap with each other. In other words, when the four cameras 10, 11, 12, and 13 are each mounted on back/forth and right/left parts of the vehicle, information on subject distances in the right front direction FR, left front direction FL, right rear direction RR, and left rear direction RL of the vehicle can be obtained. The directions FR, FL, RR, and RL are directions when taking the vehicle center O as the origin.

On the other hand, information on subject distances cannot be obtained about directions between right front direction FR and left front direction FL, between left front direction FL and left rear direction RL, between left rear direction RL and right rear direction RR, and between right rear direction RR and right front direction FR. Therefore, by using information on subject distances of the four directions FR, FL, RR, and RL each directed between neighboring cameras, an image is projected by generating a plane of projection so as to have an interpolated distance for a middle angle. "Interpolation" means to obtain a function value or an approximate value for an arbitrary point between two points.

"Middle angle" means an angle other than the four directions FR, FL, RR, and RL in which information on subject distances can be obtained by the distance information acquisition unit 35, when viewed from the vehicle center O. That is, the middle angle is each angle between right front direction FR and left front direction FL, between left front direction FL and left rear direction RL, between left rear direction RL and right rear direction RR, or between right rear direction RR and right front direction FR.

"Interpolated distance" means that correspondence between an angle and a distance is obtained by linear interpolation, when obtaining a subject distance at a certain angle, based on distance information of two subjects, whose distance information is already obtained, closely located to the subject concerned. That is, "generating a plane of projection so as to have an interpolated distance for a middle angle" means that, based on information, obtained by the distance information acquisition unit 35, on subject distances about subjects each existing in the four directions FR, FL, RR, and RL, a subject distance other than that in those directions is obtained.

The following is a method of obtaining a subject distance of a subject located in a direction other than the directions FR, FL, RR, and RL. First, two directions which are closely located to a subject whose subject distance is to be obtained are selected from among the directions FR, FL, RR, and RL. Next, assuming that a subject distance and an angle are in linear relation, the subject distance is obtained by using the linear interpolation based on distance information of two subjects, whose distance information is already known, existing in the selected two directions. Here, "angle" means an angle showing a direction of the subject. Thus, a phenomenon can be suppressed in which a lacked portion in the subject is generated at a boundary portion between the cameras. Or, a phenomenon can be suppressed in which an overlapped portion is generated at a boundary portion between the cameras.

Figure 8:
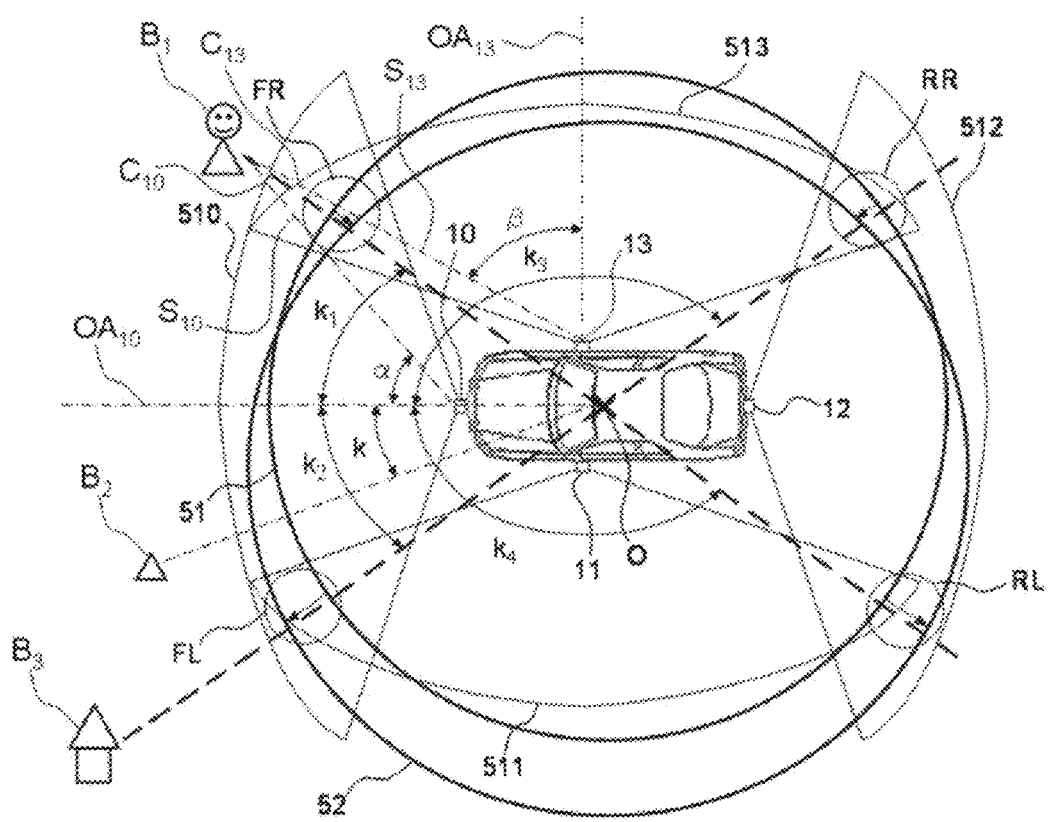
FIG. 8 is a diagram showing a method of correcting a plane of projection in Embodiment 2.

FIG. 8 is a diagram showing a method of correcting a plane of projection. FIG. 8 is a top view of the vehicle. Planes indicated by the thick solid lines in FIG. 8 show examples of common planes of projection for projecting the images of the cameras 10, 11, 12, and 13.

In FIG. 8, the camera 10 is mounted at the center of front side surface of the vehicle. The camera 11 is mounted at the center of left side surface of the vehicle. The camera 12 is mounted at the center of rear side surface of the vehicle. The camera 13 is mounted at the center of right side surface of the vehicle.

A camera view-angle range 510 is a view-angle range of the camera 10. A camera view-angle range 511 is a view-angle range of the camera 11. A camera view-angle range 512 is a view-angle range of the camera 12. A camera view-angle range 513 is a view-angle range of the camera 13. The camera view-angle ranges 510, 511, 512, and 513 are indicated by dashed lines.

Each of planes of projection 51, 52 is a plane of projection when images are combined. The plane of projection 51 before correction is corrected to the plane of projection 52 after correction by processing described later. For example, each of the planes of projection 51, 52 forms a round shape having a vehicle center O as its center when viewed from above.

By using the distance information of subject obtained from the distance information acquisition unit 35, the image combination unit 30 performs correction on a plane (plane of projection) on which a camera image is projected, at portions where view angles of the neighboring cameras overlap with each other. The plane of projection after the correction is not a round shape having a vehicle center O as its center, like the plane of projection described above. By the correction on the plane of projection, a plane of projection reflecting the actual subject distance can be set. That is, the plane of projection after the correction is obtained by changing the shape of plane of projection in accordance with the subject, whose subject distance is calculated, each existing in the four directions FR, FL, RR, and RL.

Therefore, when images captured by a plurality of cameras are subject to viewpoint conversion and combination, generation of a lacked portion or an overlapped portion in the subject at a boundary between the combined images, caused by the difference between an actual subject distance and a distance to the plane of projection, can be suppressed. Note that, when a subject existing in the four directions FR, FL, RR, and RL changes, the shape and position of the corrected plane of projection change accordingly.

In the plane of projection 52 after correction in FIG. 8, with respect to the plane of projection 51 before correction, correction is made by shifting to the near side in the right front direction FR of the vehicle. Similarly, in the plane of projection 52 after correction, the image in the right rear direction RR of the vehicle is shifted to the near side by the correction. In the plane of projection 52 after correction, with respect to the plane of projection 51 before correction, correction is made by shifting to the deep side in the left front direction FL of the vehicle. Similarly, in the plane of projection 52 after correction, the image in the left rear direction RL of the vehicle is shifted to the deep side by the correction. The plane of projection is corrected for a subject at a middle angle by obtaining a distance thereto by interpolation. Here, "near side" means a direction near to the vehicle. "Deep side" means a direction away from the vehicle.

A distance to a subject that has an unknown distance thereto and that is captured between two common subjects which are captured by a single camera, is obtained by performing linear interpolation of correspondence between an angle and a distance to each of the two common subjects sandwiching the subject having the unknown distance.

In interpolating a distance to a subject, when performing linear interpolation with respect to an angle, a distance L to a subject at a middle angle is calculated by the following expression (1).

$$L = L_1 + (L_2 - L_1) \times (k_2 - k_1)/(k - k_1) \quad (1)$$

In FIG. 8, a subject at a middle angle is shown as a subject $B_2$.

Here, an angle k is an angle showing a direction of the subject B whose distance L is to be obtained. That is, the angle k is an angle between a straight line connecting the vehicle center O and the subject B, and a reference axis passing through the vehicle center O. An angle $k_1$ is an angle showing a direction of a subject whose distance information is known, which is located in the right side of the subject B with respect to the direction of angle k, and which is closest to the direction of angle k. An angle $k_2$ is an angle showing a direction of a subject whose distance information is known, which is located in the left side of the subject B with respect to the direction of angle k, and which is closest to the direction of angle k. That is, each of the angles $k_1$, $k_2$ is an angle between a straight line connecting the vehicle center O and a position already known, and the reference axis passing through the vehicle center O.

In FIG. 8, the optical axis $OA_{10}$ of the camera 10 is employed as a reference axis, as an example. Also, the subject B is shown as the subject $B_2$. "A direction of a subject whose distance information is known" means, for example, one of the four directions FR, FL, RR, and RL. The distance L shows a distance to a subject corresponding to the angle k, which is a distance from the vehicle center O to the subject $B_2$ in FIG. 8. A distance $L_1$ shows a distance to a subject corresponding to the angle $k_1$, which is a distance from the vehicle center O to the subject $B_1$ in FIG. 8. A distance $L_2$ shows a distance to a subject corresponding to the angle $k_2$, which is a distance from the vehicle center O to the subject $B_3$ in FIG. 8.

As shown in FIG. 8, a distance to the subject $B_1$ existing in the direction FR is shorter than a distance to the subject $B_3$ existing in the direction FL. Therefore, correction is made by shifting to the near side in the right front direction FR of the vehicle. Correction is made by shifting to the deep side in the left front direction FL of the vehicle. Thus, the plane of projection 51 is corrected to the plane of projection 52.

In order to get a smooth connection in a plane of projection when middle angle interpolation is performed, an interpolation method can be employed in which a change amount of distance with respect to a conversion amount of angle for a plane of projection in the left side is set to be equal to that for a plane of projection in the right side, based on each direction of the subject whose distance information is known. In FIG. 8, the plane of projection is shifted so as to correspond to a curved line in which the subject $B_1$ and the subject $B_3$ are smoothly connected. When performing such an interpolation, interpolation using a cubic function is performed by referring to distance information of two subjects in both right and left directions with respect to an angle to be interpolated.

An arithmetic expression of a distance in this case is shown by the expression (2).

$$L = ak_3 + bk_2 + ck + d \quad (2)$$

Here, coefficients a, b, c, and d are determined so that the following expressions (3), (4), (5), and (6) are satisfied.

$$L_1 = ak_1^3 + bk_1^2 + ck_1 + d \quad (3)$$

$$L_2 = ak_2^3 + bk_2^2 + ck_2 + d \quad (4)$$

$$L_3 = ak_3^3 + bk_3^2 + ck_3 + d \quad (5)$$

$$L_4 = ak_4^3 + bk_4^2 + ck_4 + d \quad (6)$$

Here, an angle k is an angle showing a direction of a subject whose distance L is to be obtained. An angle $k_1$ is an angle showing a direction of a subject whose distance information is known, which is located in the right side of the direction of angle k, and which is closest to the direction of angle k, i.e. an angle between the direction FR and the reference axis $OA_{10}$ in FIG. 8. An angle $k_2$ is an angle showing a direction of a subject whose distance information is known, which is located in the left side of the direction of angle k, and which is closest to the direction of angle k, i.e. an angle between the direction FL and the reference axis $OA_{10}$ in FIG. 8. An angle $k_3$ is an angle showing a direction of a subject whose distance information is known, which is located in the right side of the direction of angle k, and which is second closest to the direction of angle k, i.e. an angle between the direction RR and the reference axis $OA_{10}$ in FIG. 8. An angle $k_4$ is an angle showing a direction of a subject whose distance information is known, which is located in the left side of the direction of angle k, and which is second closest to the direction of angle k, i.e. an angle between the direction RL and the reference axis $OA_{10}$ in FIG. 8. "A direction of a subject whose distance information is known" means, for example, one of the four directions FR, FL, RR, and RL.

The distance L shows a distance from the vehicle center O to a subject existing in the angle k. A distance $L_1$ shows a distance from the vehicle center O to a subject existing in the angle $k_1$. A distance $L_2$ shows a distance from the vehicle center O to a subject existing in the angle $k_2$. A distance $L_3$ shows a distance from the vehicle center O to a subject existing in the angle $k_3$. A distance $L_4$ shows a distance from the vehicle center O to a subject existing in the angle $k_4$.

When correction is made by using angles each showing a subject direction whose distance information is known, it is possible to make a plane of projection always form a round shape. At that time, a center position and a radius of a plane of projection is calculated, for example, by the least squares method using a combination of an angle showing a subject direction whose distance information is known and a subject distance of a subject whose distance information is known.

Figure 9:
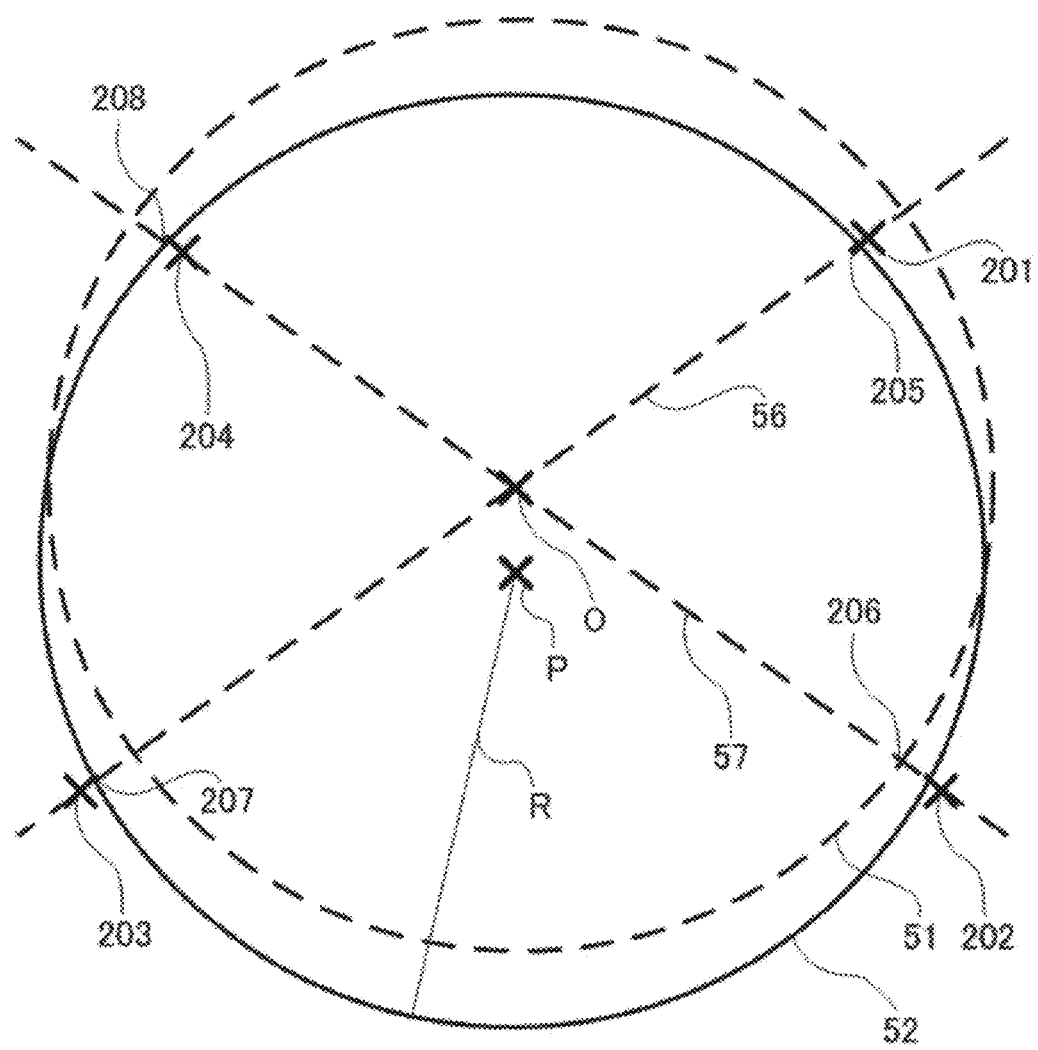
FIG. 9 is a diagram showing another method of correcting a plane of projection in Embodiment 2.

A method of calculating a distance in this case will be described by using FIG. 9. FIG. 9 is a diagram showing a method of correcting a plane of projection. In FIG. 9, the plane of projection 51 before correction forms a round shape having a center O as its center. The center O shows the position of vehicle center. The plane of projection 51 before correction is indicated by a dashed line. The plane of projection 52 after correction forms a round shape having a center P as its center. A radius R shows a radius of the plane of projection 52 after correction. The plane of projection 52 after correction is indicated by a solid line. Points 201, 202, 203, and 204 each show a position of a subject whose distance information is known. The direction and distance information of the subject are known at the points 201, 202, 203, and 204.

An index value when a circle to be a plane of projection is determined by using the least squares method is assumed to be a value X. When using each distance of positions 205, 206, 207, and 208, and each distance of points 201, 202, 203, and 204 whose distance information is known, the value X is a value obtained by adding values each acquired by squaring a value of distance difference between the position 205 and the point 201, position 206 and point 202, position 207 and point 203, or position 208 and point 204. Each distance of positions 205, 206, 207, and 208 is a distance from the vehicle center O to each of the positions 205, 206, 207, and 208, respectively. Each distance of points 201, 202, 203, and 204 is a distance from the vehicle center O to each of the points 201, 202, 203, and 204, respectively. The positions 205, 207, or 206, 208 are on a straight line 56 or 57 which connects the points 201, 203 whose distance information is known and the vehicle center O, or connects the points 202, 204 whose distance information is known and the vehicle center O, respectively, and are positions where the plane of projection after correction and the straight lines 56, 57 intersect. The center P and the radius R of the plane of projection after correction are determined so that the value X is minimized.

Similar to Embodiment 1, the image cutting out unit 32 receives a signal outputted from the steering angle detection unit 20. In FIG. 5, the unit 32 receives the outputted signal from the image combination unit 30 via the memory 31. The image cutting out unit 32 may directly receive the outputted signal from the image combination unit 30. The image cutting out unit 32 performs processing of changing an image cutting out range in accordance with a steering angle of steering wheel. In a state where the steering wheel is not turned, the image cutting out unit 32 cuts out an image corresponding to a direct front view from the vehicle and having an equal width in both right and left from a center of a combined image. When the steering wheel is turned right, the image cutting out unit 32 shifts the cutting out range to the right. When the steering wheel is turned left, the image cutting out unit 32 shifts the cutting out range to the left.

The correspondence between the steering wheel rudder angle and the cutting out portion may be calculated by an arithmetic expression so that the cutting out portion is shifted continuously in proportion to the steering wheel rudder angle. Or, the correspondence between the steering wheel rudder angle and the cutting out portion may be determined by processing on a case-by-case basis in which a specific cutting out portion is assigned to a steering wheel rudder angle within a certain range. When the arithmetic expression is employed, the image cutting out portion is shifted continuously. On the other hand, when the processing on a case-by-case basis is employed, the image cutting out portion is shifted discontinuously. However, if the processing on a case-by-case basis is employed, a processing amount can be reduced compared to that when the arithmetic expression is employed. In a case where the visibility of driver is not deteriorated, employing the processing on a case-by-case basis brings an advantage that faster processing is realized.

The display unit 40 exhibits a front image to the driver by displaying a cutting out image on a display screen.

As described above, based on positions of a common subject B on a plurality of images captured by the cameras 10, 11, 12, and 13 for capturing surrounding images of vehicle, the distance information acquisition unit 35 calculates a subject distance (first subject distance) from a vehicle reference position O to the common subject B, and calculates, based on the subject distance (first subject distance), a subject distance (second subject distance) to a subject captured by one of the cameras 10, 11, 12, and 13.

Based on the first subject distance (subject distance from reference position O to common subject B) and the second subject distance (subject distance to a subject captured by one of cameras), the image combination unit 30 converts the captured images in which the cameras 10, 11, 12, and 13 are employed as viewpoints to images in which the reference position O is employed as a viewpoint, and combines the converted images on a single plane of projection.

Based on the positions of cameras 10, 11, 12, and 13, reference directions of cameras 10, 11, 12, and 13, view angles of cameras 10, 11, 12, and 13, and positions of the common subject on the captured images, the distance information acquisition unit 35 obtains a direction of the common subject with respect to each of the cameras 10, 11, 12, and 13, and calculates the first subject distance (subject distance from reference position O to common subject B) based on a position of the common subject obtained from directions of the common subject with respect to two or more cameras.

The image combination unit 30 disposes the subject B at a position where a straight line that connects the reference position O and the subject B intersects with the plane of projection.

Based on the first subject distances (subject distance from reference position O to common subject B) of two common subjects sandwiching the subject having the second subject distance (subject distance to a subject captured by one of cameras) and on angles of the two with respect to the reference direction of reference position O, the distance information acquisition unit 35 obtains the second subject distance (subject distance to a subject captured by one of cameras) by performing linear interpolation of correspondence between subject distances and angles.

The image combination unit 30 sums values each acquired by squaring a value of difference between a distance from the reference position O to the plane of projection and the first subject distance (subject distance from reference position O to common subject B) for each common subject, and changes the plane of projection so that the summed value is minimized.

The driving support device 110 thus configured measures a distance to each subject and combines images. Thus, the driving support device 110 can generate a combined image with high quality in which generation of an overlapped portion or a lacked portion in the subject at a combined portion between the neighboring camera images is reduced. And, it is possible for the driving support device 110 to improve driver's visibility of a surrounding status of vehicle.

Embodiment 3

Figure 10:
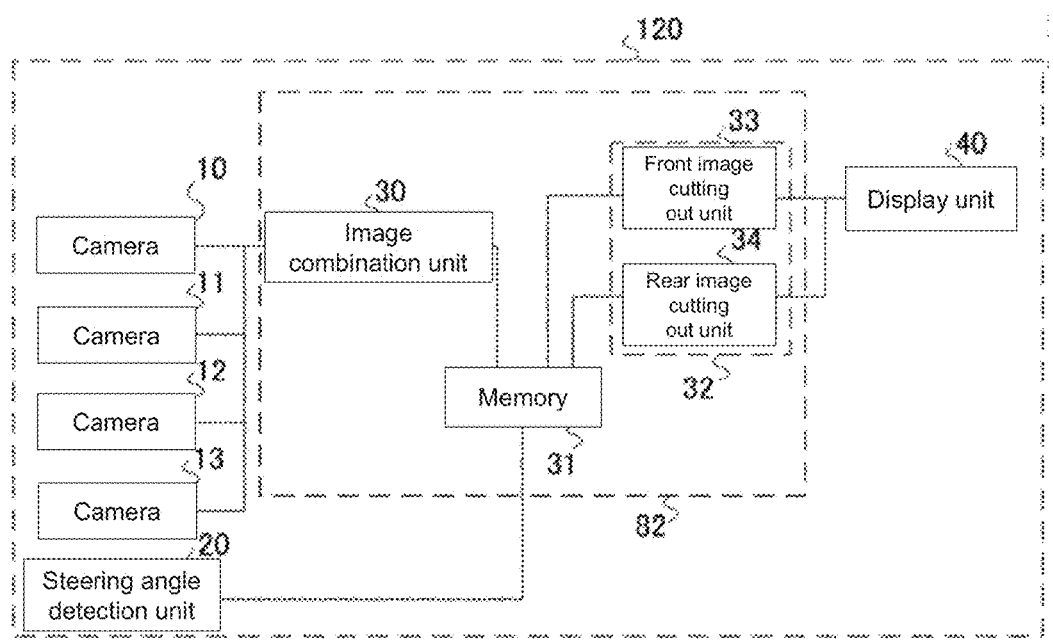
FIG. 10 is a block diagram showing a driving support device in Embodiment 3.

FIG. 10 is a block diagram showing a driving support device 120 in Embodiment 3. The driving support device 120 according to the present invention includes cameras 10, 11, 12, and 13, a steering angle detection unit 20, an image combination unit 30, a front image cutting out unit 33, a rear image cutting out unit 34, and a display unit 40. The driving support device 120 may further include a memory 31.

An image processing device 82 according to Embodiment 3 includes an image combination unit 30. The image processing device 82 may include the front image cutting out unit 33 and the rear image cutting out unit 34. The image processing device 82 may include the memory 31.

The driving support device 120 is different from the driving support device 100 in a manner that the image cutting out unit 32 includes the front image cutting out unit 33 and the rear image cutting out unit 34. The cameras 10, 11, 12, and 13, the steering angle detection unit 20, the image combination unit 30, the display unit 40, and the memory 31 of the driving support device 120 have similar functions with those of the cameras 10, 11, 12, and 13, the steering angle detection unit 20, the image combination unit 30, the display unit 40, and the memory 31 of the driving support device 100. Therefore, contents described about the driving support device 100 will be similarly applicable if there is no specific description. Also, definitions of terms in Embodiment 1 will be similarly applicable if there is no specific description. In addition, the driving support device 110 in Embodiment 2 may employ the front image cutting out unit 33 and the rear image cutting out unit 34 in Embodiment 3.

The image cutting out unit 32 of the driving support device 120 includes the front image cutting out unit 33 and the rear image cutting out unit 34. The cameras 10, 11, 12, and 13 capture surrounding images of a vehicle. The steering angle detection unit 20 detects a turning angle of a steering wheel of vehicle. The image combination unit 30 combines inputted images from the cameras 10, 11, 12, and 13, and generates an image recording whole circumference of the surroundings of vehicle. The memory 31 stores image data outputted from the image combination unit 30. By referring to the image stored in the memory 31, the front image cutting out unit 33 determines a cutting out area in accordance with a value outputted from the steering angle detection unit 20, and cuts out an image corresponding to a front view of vehicle. By referring to the image stored in the memory 31, the rear image cutting out unit 34 determines a cutting out area in accordance with a value outputted from the steering angle detection unit 20, and cuts out an image corresponding to a rear view of vehicle. The display unit 40 displays the cutting out image.

Similar to Embodiment 1, the cameras 10, 11, 12, and 13 are each mounted on back/forth and right/left parts of the vehicle. The cameras 10, 11, 12, and 13 are disposed so that camera view angles of the four cameras 10, 11, 12, and 13 include the surroundings of vehicle in all directions. "Surroundings of a vehicle in all directions" means 360-degree directions of the surroundings of a vehicle.

Similar to Embodiment 1, the image combination unit 30 performs viewpoint conversion and combination of images, and thus generates an image in which all the images of the four cameras 10, 11, 12, and 13 are connected in the horizontal direction.

The front image cutting out unit 33 receives a signal outputted from the steering angle detection unit 20. In FIG. 10, the unit 33 receives the outputted signal from the steering angle detection unit 20 via the memory 31. The front image cutting out unit 33 performs processing of changing an image cutting out range in accordance with a steering angle of steering wheel. In a state where the steering wheel is not turned, the front image cutting out unit 33 cuts out an image corresponding to a direct front view from the vehicle and having an equal width in both right and left from a center of a combined image. "Equal width in both right and left" means that a distance from the left side is equal to a distance from the right side. When the steering wheel is turned right, the front image cutting out unit 33 shifts the cutting out range to the right. When the steering wheel is turned left, the front image cutting out unit 33 shifts the cutting out range to the left.

The correspondence between the steering wheel rudder angle and the cutting out portion may be calculated by an arithmetic expression so that the cutting out portion is shifted continuously in proportion to the steering wheel rudder angle. Or, the correspondence between the steering wheel rudder angle and the cutting out portion may be determined by processing on a case-by-case basis in which a specific cutting out portion is assigned to a steering wheel rudder angle within a certain range. When the arithmetic expression is employed, the image cutting out portion is shifted continuously. On the other hand, when the processing on a case-by-case basis is employed, the image cutting out portion is shifted discontinuously. However, if the processing on a case-by-case basis is employed, a processing amount can be reduced compared to that when the arithmetic expression is employed. In a case where the visibility of driver is not deteriorated, employing the processing on a case-by-case basis brings an advantage that faster processing is realized.

The rear image cutting out unit 34 receives a signal outputted from the steering angle detection unit 20. In FIG. 10, the unit 34 receives the outputted signal from the steering angle detection unit 20 via the memory 31. The rear image cutting out unit 34 performs processing of changing an image cutting out range in accordance with a steering angle of steering wheel. In a state where the steering wheel is not turned, the rear image cutting out unit 34 cuts out an image corresponding to a straight behind view from the vehicle and having an equal width in both right and left from a center of a combined image. When the steering wheel is turned right, the rear image cutting out unit 34 shifts the cutting out range to the left. When the steering wheel is turned left, the rear image cutting out unit 34 shifts the cutting out range to the right. "Straight behind" means a rear direction of 180 degrees with respect to the direct front when facing toward the direct front from a viewing position. That is, it means right behind.

The correspondence between the steering wheel rudder angle and the cutting out portion may be calculated by an arithmetic expression so that the cutting out portion is shifted continuously in proportion to the steering wheel rudder angle. Or, the correspondence between the steering wheel rudder angle and the cutting out portion may be determined by processing on a case-by-case basis in which a specific cutting out portion is assigned to a steering wheel rudder angle within a certain range. When the arithmetic expression is employed, the image cutting out portion is shifted continuously. On the other hand, when the processing on a case-by-case basis is employed, the image cutting out portion is shifted discontinuously. However, if the processing on a case-by-case basis is employed, a processing amount can be reduced compared to that when the arithmetic expression is employed. In a case where the visibility of driver is not deteriorated, employing the processing on a case-by-case basis brings an advantage that faster processing is realized.

In an example of generating a combined image shown in FIG. 3, a left end and a right end of the combined image correspond to a straight behind image. That is, it is a frontward image when the driver turns to look back. That is, it is "straight behind". In order to generate an image of frontward view when the driver turns to look back, an image is generated by connecting the left end and the right end of the original image. In Embodiment 3, however, an image of rear view is generated which is different from the frontward image when the driver turns to look back. The horizontal direction for the driver who faces the front coincides with the horizontal direction of rear image. This is because, if an image when the driver turns to look back is displayed as it is, the horizontal direction for the driver who faces the front direction and the horizontal direction of the image are opposite, i.e. do not coincide.

The image cutting out unit 33 cuts out an image and performs processing for generating an image combined at a connecting portion. As to a rear image, in order to avoid confusion when the driver checks the image, a processing is performed in which a mirror-reversed image is connected so that the horizontal direction for the driver coincides with the horizontal direction of the image. "Mirror-reverse" means that the left side and the right side are reversed. Here, "the horizontal direction for a driver" means that the horizontal direction when a driver looks a front view of vehicle coincides with the horizontal direction of a rear image. Thus, "rear image" is not an image same with that when the driver turns to look back.

Figure 11:
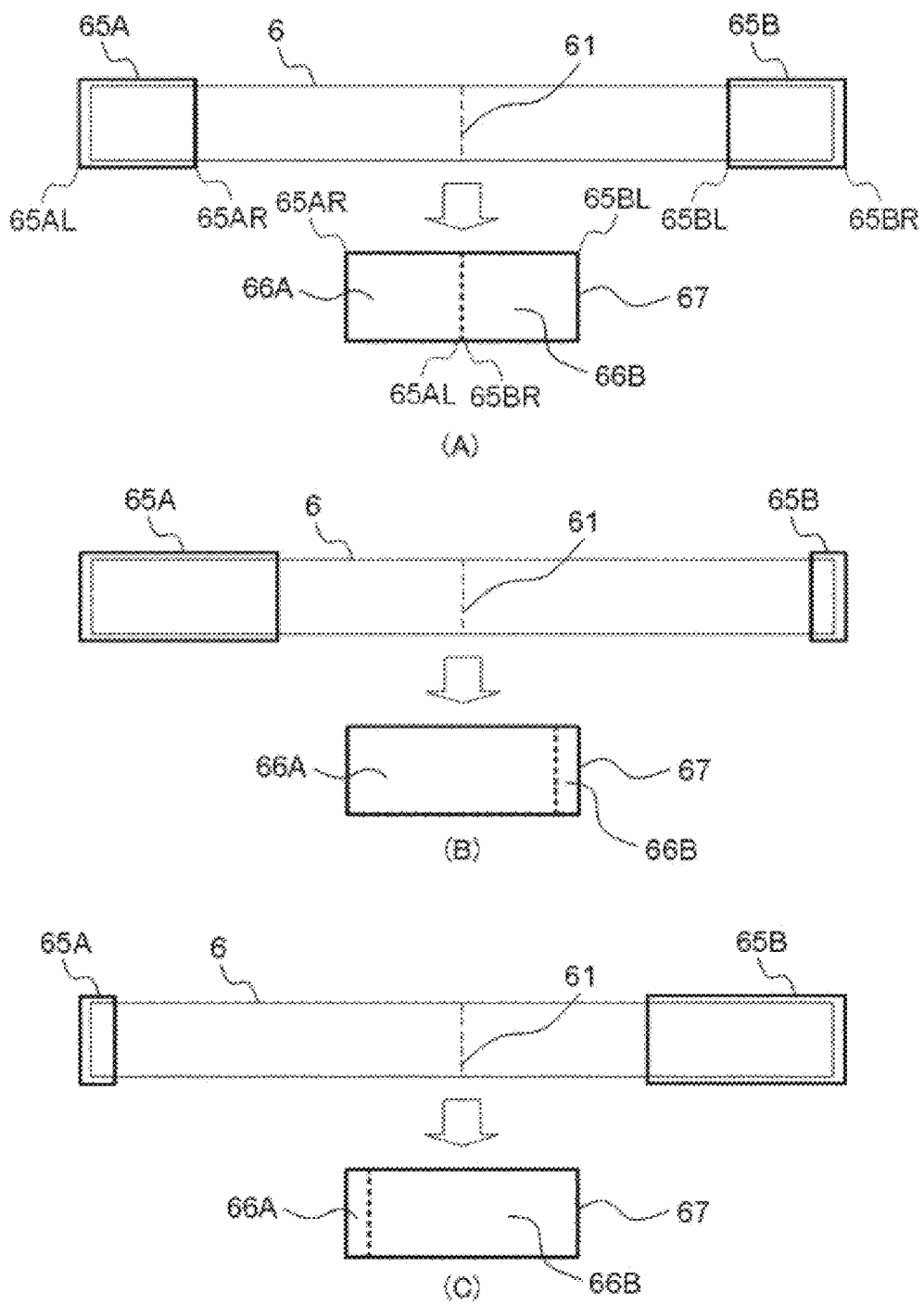
FIG. 11 is a diagram showing correspondence between a steering angle of a steering wheel and a position where a rear image of a vehicle is cut out in Embodiment 3.

FIG. 11 is a diagram showing correspondence between a steering angle of a steering wheel and a position where a rear image of a vehicle is cut out. As shown in FIG. 11, a cutting out position of image is changed in accordance with the steering angle of steering wheel. When the steering wheel is not turned ((A) in FIG. 11), an area having a width from the left end of the image and another area having the same width from the right end thereof are cut out and connected in a mirror-reversed manner. In a connected image 67, an image 66A acquired by mirror-reversing a cutting out image 65A and an image 66B acquired by mirror-reversing a cutting out image 65B are connected. That is, the left end 65AL of the cutting out image 65A and the right end 65BR of the cutting out image 65B are connected. The left end 65BL serves as the right end of the connected image 67 and the right end 65AR serves as the left end of the connected image 67. Here, "connection" has the same meaning with "combination". "Combination" means connection of images. Therefore, "combination" does not include overlapping of images, each captured by the respective cameras, on a single image.

(A) in FIG. 11 shows a case where the steering wheel rudder angle is 0 degree. In (A) in FIG. 11, when the cutting out images 65A and 65B are combined, the cutting out images 65A and 65B are combined in a mirror-reversed manner. In the case shown in (A) in FIG. 11, the width of cutting out image 65A is the same with that of cutting out image 65B. (B) in FIG. 11 shows a case where the steering wheel rudder angle is 10 degrees to the left. In (B) in FIG. 11, when the cutting out images 65A and 65B are combined, the cutting out images 65A and 65B are combined in a mirror-reversed manner. In the case shown in (B) in FIG. 11, the width of cutting out image 65A is wider and the width of cutting out image 65B is narrower. (C) in FIG. 11 shows a case where the steering wheel rudder angle is 10 degrees to the right. In (C) in FIG. 11, when the cutting out images 65A and 65B are combined, the cutting out images 65A and 65B are combined in a mirror-reversed manner. In the case shown in (C) in FIG. 11, the width of cutting out image 65A is narrower and the width of cutting out image 65B is wider.

When the steering wheel is turned left ((B) in FIG. 11), a cutting out area at the left end portion of combined image 67 is broadened and a cutting out area at the right end portion thereof is narrowed. That is, an image cutting out range is shifted to the right. On the other hand, when the steering wheel is turned right ((C) in FIG. 11), a cutting out area at the right end portion of combined image 67 is broadened and a cutting out area at the left end portion thereof is narrowed. That is, an image cutting out range is shifted to the left. By performing cutting out, mirror-reversing, and connecting of images in this way, it is possible to obtain a rear image of a vehicle in a direction which coincides with a vehicle traveling direction in accordance with the steering wheel rudder angle.

The image cutting out unit 32 cuts out a part of an image on a plane of projection. Here, a left side is defined to be the left side with respect to the front side of vehicle, and a right side is defined to be the right side with respect to the front side of vehicle. As to a rear image of a vehicle, the image cutting out unit 32 divides the image, projected on the plane of projection, at the rear side of vehicle, and cuts out the image 65A located at the left side of the division and the image 65B located at the right side thereof. The image combination unit 30 disposes the image 65A of the left side so that the divided surface 65AL faces to the left side, and disposes the image 65B of the right side so that the divided surface 65BR faces to the right side. Then, the unit 30 mirror-reverses the image 65A of the left side and the image 65B of the right side, and connects the divided surface 65AL of the image 65A of the left side and the divided surface 65BR of the image 65B of the right side.

When an image is cut out from a cutting out position in the front side of vehicle, the image cutting out unit 32 shifts the cutting out position in a direction same with that of the steering angle of vehicle. When an image is cut out from a cutting out position in the rear side of vehicle, the image cutting out unit 32 shifts the cutting out position in a direction opposite to that of the steering angle of vehicle.

Figure 12:
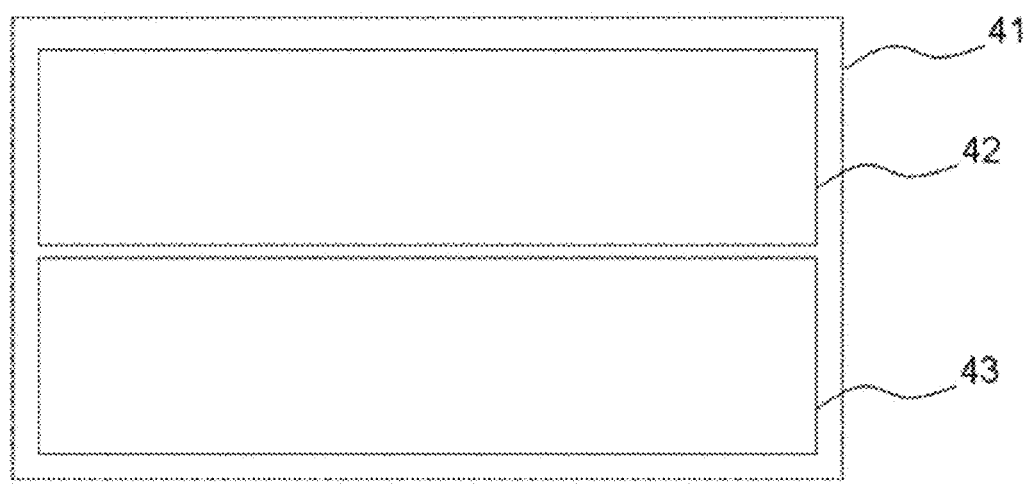
FIG. 12 is a diagram showing a method of displaying a front image of a vehicle and a rear image of the vehicle in Embodiment 3.

The display unit 40 displays the cutting out image on the screen. The display unit 40 presents connection of a front image and a rear image to the driver. FIG. 12 is a diagram showing a method of displaying a front image of a vehicle and a method of displaying a rear image of the vehicle. In FIG. 12, a front image 42 of vehicle and a rear image 43 of vehicle are concurrently displayed on a display screen 41 of the display unit 40. The front image 42 of vehicle is displayed on the upper side of the display screen 41. The rear image 43 of vehicle is displayed on the lower side of the display screen 41.

By displaying the front image and the rear image in a stacked manner, it is possible to concurrently check an obstacle in the front side of vehicle and an obstacle in the rear side of vehicle.

In the driving support device 120 thus configured, a front image in the vehicle traveling direction can be checked in accordance with a steering angle of steering wheel. Also, the driving support device 120 can improve visibility of obstacles in oblique front and rear of the vehicle, which are difficult to check due to interruption caused by a pillar of its own vehicle etc., or of existence or non-existence of other vehicles.

In addition, by displaying the front image of vehicle and the reversed rear image of vehicle on a single screen, obstacles and existence or non-existence of other vehicles in the front side of vehicle, and obstacles and existence or non-existence of other vehicles in the rear side of vehicle can be concurrently checked on the single screen.

While the embodiments of the present invention are described above, the present invention should not be limited to these embodiments.

REFERENCE NUMERALS 10, 11, 12, 13 cameras; 100, 110, 120 driving support devices; 20 steering angle detection unit; 201, 202, 203, 204 points; 205, 206, 207, 208 positions; 30 image combination unit; 31 memory; 32 image cutting out unit; 33 front image cutting out unit; 34 rear image cutting out unit; 35 distance information acquisition means; 40 display unit; 41 display screen; 42 front image of vehicle; 43 rear image of vehicle; 5 plane of projection; 510, 511, 512, 513 camera view-angle ranges; 51 plane of projection before correction; 52 plane of projection after correction; 53, 54, 55, 56, 57 straight lines; 6 combined image; 61 image center; 62 cutting out range; 63A, 63B, 63C, 63L matching areas; 64R image of right camera; 64L image of left camera; 65A, 65B cutting out images; 66A, 66B mirror-reversed cutting out images; 67 connected image; 71 center position for combining images; 72 camera position; 73 plane of projection when images are combined; 74 subject position; 80, 81, 82 image processing devices; A, C positions; B subject; O, P centers; R radius; S straight line; L distance; X value; OA optical axis; k, $k_1$, $k_2$, α, β angles; a, b, c, d coefficients; FR right front direction; FL left front direction; RR right rear direction; RL left rear direction; and DA, DB, DC subject distances.

The invention claimed is:
1. An image processing device comprising:
a computer processor; and
a memory storing computer instructions which, when executed by the computer processor, performs a process including receiving image data of a plurality of captured images captured respectively by a plurality of cameras, each of the plurality of cameras being disposed at different positions, analyzing the received image data to
- calculate, based on positions of a common subject on two or more of the plurality of captured images, a first subject distance from a reference position to the common subject;
- calculate, based on the first subject distance, distance information of a subject on each of the captured images; and
- calculate, based on the distance information of the subject, a corrected position of a common plane of projection configured with a curved surface for each of the captured images where the reference position is employed as a viewpoint, processing the received image data to
- convert the plurality of captured images to images projected to the common plane of projection; and
- generating a combined image by combining the projected images, and causing the combined image to be displayed, wherein the processing of the received image data reduces distortion in the combined image at a boundary between two of the combined projected images.

2. The image processing device in claim 1, wherein the process further includes
- obtaining, based on the positions of the cameras, reference directions of the cameras, view angles of the cameras, and the positions of the common subject on the captured images, a direction of the common subject with respect to each of the cameras, and calculating the first subject distance based on a position of the common subject obtained from directions of the common subject with respect to two or more of the plurality of cameras corresponding to the two or more of the plurality of captured images.

3. The image processing device in claim 1, wherein, in combining the projected images, the process disposes the subject at a position where a straight line that connects the reference position and the subject on the captured image intersects with the common plane of projection.

4. The image processing device in claim 2, wherein, in combining the projected images, the process disposes the subject at a position where a straight line that connects the reference position and the subject on the captured image intersects with the common plane of projection.

5. The image processing device in claim 1, wherein
the process calculates the first subject distance for each portion where view angles of two neighboring cameras, from among the plurality of cameras, overlap with each other, and wherein
the process employs, as to the distance information of the subject on each of the captured images, based on two first subject distances and two angles each showing a direction of the common subject corresponding to each of the two first subject distances which are obtained from the overlapped portions including the captured image concerned, a value obtained by performing linear interpolation of correspondence between subject distances and angles as the distance information of the subject on the captured image.

6. The image processing device in claim 2, wherein
the process calculates the first subject distance for each portion where view angles of two neighboring cameras, from among the plurality of cameras, overlap with each other, and wherein
the process employs, as to the distance information of the subject on each of the captured images, based on two first subject distances and two angles each showing a direction of the common subject corresponding to each of the two first subject distances which are obtained from the overlapped portions including the captured image concerned, a value obtained by performing linear interpolation of correspondence between subject distances and angles as the distance information of the subject on the captured image.

7. The image processing device in claim 3, wherein
the process calculates the first subject distance for each portion where view angles of two neighboring cameras, from among the plurality of cameras, overlap with each other, and wherein
the process employs, as to the distance information of the subject on each of the captured images, based on two first subject distances and two angles each showing a direction of the common subject corresponding to each of the two first subject distances which are obtained from the overlapped portions including the captured image concerned, a value obtained by performing linear interpolation of correspondence between subject distances and angles as the distance information of the subject on the captured image.

8. The image processing device in claim 1, wherein the process sums values each acquired by squaring a value of difference between a distance from the reference position to the common plane of projection and the first subject distance for each common subject, and changes the common plane of projection so that the summed value is minimized.

9. The image processing device in claim 2, wherein the process sums values each acquired by squaring a value of difference between a distance from the reference position to the common plane of projection and the first subject distance for each common subject, and changes the common plane of projection so that the summed value is minimized.

10. The image processing device in claim 3, wherein the process sums values each acquired by squaring a value of difference between a distance from the reference position to the common plane of projection and the first subject distance for each common subject, and changes the common plane of projection so that the summed value is minimized.

11. The image processing device in claim 5, wherein the process sums values each acquired by squaring a value of difference between a distance from the reference position to the common plane of projection and the first subject distance for each common subject, and changes the common plane of projection so that the summed value is minimized.

12. The image processing device in claim 1, the process further comprising:
cutting out a part of an image on the common plane of projection, wherein
the plurality of cameras are mounted on a vehicle, and wherein
if a left side is defined to be a left side with respect to a front side of the vehicle, and a right side is defined to be a right side with respect to the front side of the vehicle,
the cutting out divides a rear image of the vehicle, projected on the common plane of projection, at a rear side of the vehicle, and cuts out an image located at the left side of the division and an image located at the right side thereof, and the processing of the received image data disposes the image of the left side so that a divided surface thereof faces to the left side; disposes the image of the right side so that a divided surface thereof faces to the right side; mirror-reverses the image of the left side and the image of the right side; and connects the divided surface of the image of the left side and the divided surface of the image of the right side.

13. The image processing device in claim 2, the process further comprising:

cutting out a part of an image on the common plane of projection, wherein the plurality of cameras are mounted on a vehicle, and wherein if a left side is defined to be a left side with respect to a front side of the vehicle, and a right side is defined to be a right side with respect to the front side of the vehicle, the cutting out divides a rear image of the vehicle, projected on the common plane of projection, at a rear side of the vehicle, and cuts out an image located at the left side of the division and an image located at the right side thereof, and the processing of the received image data disposes the image of the left side so that a divided surface thereof faces to the left side; disposes the image of the right side so that a divided surface thereof faces to the right side; mirror-reverses the image of the left side and the image of the right side; and connects the divided surface of the image of the left side and the divided surface of the image of the right side.

14. The image processing device in claim 3, the process further comprising:

cutting out a part of an image on the common plane of projection, wherein the plurality of cameras are mounted on a vehicle, and wherein if a left side is defined to be a left side with respect to a front side of the vehicle, and a right side is defined to be a right side with respect to the front side of the vehicle, the cutting out divides a rear image of the vehicle, projected on the common plane of projection, at a rear side of the vehicle, and cuts out an image located at the left side of the division and an image located at the right side thereof, and the processing of the received image data disposes the image of the left side so that a divided surface thereof faces to the left side; disposes the image of the right side so that a divided surface thereof faces to the right side; mirror-reverses the image of the left side and the image of the right side; and connects the divided surface of the image of the left side and the divided surface of the image of the right side.

15. The image processing device in claim 5, the process further comprising:

cutting out a part of an image on the common plane of projection, wherein the plurality of cameras are mounted on a vehicle, and wherein if a left side is defined to be a left side with respect to a front side of the vehicle, and a right side is defined to be a right side with respect to the front side of the vehicle, the cutting out divides a rear image of the vehicle, projected on the common plane of projection, at a rear side of the vehicle, and cuts out an image located at the left side of the division and an image located at the right side thereof, and the processing of the received image data disposes the image of the left side so that a divided surface thereof faces to the left side; disposes the image of the right side so that a divided surface thereof faces to the right side; mirror-reverses the image of the left side and the image of the right side; and connects the divided surface of the image of the left side and the divided surface of the image of the right side.

16. The image processing device in claim 8, the process further comprising:

cutting out a part of an image on the common plane of projection, wherein the plurality of cameras are mounted on a vehicle, and wherein if a left side is defined to be a left side with respect to a front side of the vehicle, and a right side is defined to be a right side with respect to the front side of the vehicle, the cutting out divides a rear image of the vehicle, projected on the common plane of projection, at a rear side of the vehicle, and cuts out an image located at the left side of the division and an image located at the right side thereof, and the processing of the received image data disposes the image of the left side so that a divided surface thereof faces to the left side; disposes the image of the right side so that a divided surface thereof faces to the right side; mirror-reverses the image of the left side and the image of the right side; and connects the divided surface of the image of the left side and the divided surface of the image of the right side.

17. The image processing device in claim 12, wherein when an image is cut out from a cutting out position in the front side of the vehicle, the cutting out shifts the cutting out position in a direction same with that of a steering angle of the vehicle, and when an image is cut out from a cutting out position in the rear side of the vehicle, the cutting out shifts the cutting out position in a direction opposite to that of the steering angle of the vehicle.

18. The image processing device in claim 13, wherein when an image is cut out from a cutting out position in the front side of the vehicle, the cutting out shifts the cutting out position in a direction same with that of a steering angle of the vehicle, and when an image is cut out from a cutting out position in the rear side of the vehicle, the cutting out shifts the cutting out position in a direction opposite to that of the steering angle of the vehicle.

19. The image processing device in claim 14, wherein when an image is cut out from a cutting out position in the front side of the vehicle, the cutting out shifts the cutting out position in a direction same with that of a steering angle of the vehicle, and when an image is cut out from a cutting out position in the rear side of the vehicle, the cutting out shifts the cutting out position in a direction opposite to that of the steering angle of the vehicle.

20. The image processing device in claim 15, wherein when an image is cut out from a cutting out position in the front side of the vehicle, the cutting out shifts the cutting out position in a direction same with that of a steering angle of the vehicle, and when an image is cut out from a cutting out position in the rear side of the vehicle, the cutting out shifts the cutting out position in a direction opposite to that of the steering angle of the vehicle.

* * * * *